United States Patent

Leini et al.

[11] Patent Number: 5,943,782
[45] Date of Patent: Aug. 31, 1999

[54] METHOD FOR HARDENING SELECTED REGIONS OF A GUIDE BAR FOR CHAIN SAWS, AND GUIDE BAR PRODUCED THEREBY

[75] Inventors: Arvo Leini, Edsbyn; Erik Sundström; Mats Lundström, both of Sandviken, all of Sweden

[73] Assignee: Sandvik AB, Sandviken, Sweden

[21] Appl. No.: 08/761,385

[22] Filed: Dec. 6, 1996

[30] Foreign Application Priority Data

Dec. 7, 1995 [SE] Sweden ................................ 9504375

[51] Int. Cl.[6] .................................................. B23D 57/02
[52] U.S. Cl. ................................ 30/383; 30/387; 76/112
[58] Field of Search ......................... 30/383, 387; 76/112

[56] References Cited

U.S. PATENT DOCUMENTS

| | | | |
|---|---|---|---|
| 2,962,812 | 12/1960 | Gommel . | |
| 3,241,228 | 3/1966 | Rayniak et al. . | |
| 3,744,363 | 7/1973 | Espana et al. | 30/383 |
| 3,987,543 | 10/1976 | Ratz et al. | 30/383 |
| 4,768,289 | 9/1988 | Apfel et al. | 30/383 |
| 5,052,109 | 10/1991 | Vanderzanden et al. | 30/383 |
| 5,093,998 | 3/1992 | Seigneur et al. | 30/383 |
| 5,144,867 | 9/1992 | Yajima et al. | 76/112 |
| 5,407,496 | 4/1995 | Stehle et al. | 30/383 |
| 5,448,929 | 9/1995 | Sundstrom | 30/383 |
| 5,561,908 | 10/1996 | Leini | 30/383 |
| 5,596,811 | 1/1997 | Payne | 30/383 |

*Primary Examiner*—Rinaldi I. Rada
*Assistant Examiner*—Sean Pryor
*Attorney, Agent, or Firm*—Burns, Doane, Swecker & Mathis, L.L.P.

[57] ABSTRACT

A chain saw guide bar includes outer side surfaces, a longitudinal groove having side walls, and two edge surfaces. Each edge surface interconnects a side wall and an outer side surface to form therewith inner and outer corners, respectively. To edge-harden the guide bar, the edge surfaces, inner corners, and outer corners are heated above 750° C. Then, the edge surfaces and inner corners are rapidly cooled, i.e, quenched, but the outer side surfaces are cooled more slowly, whereby the inner corners are given a higher hardness than the outer corners.

4 Claims, 1 Drawing Sheet

METHOD FOR HARDENING SELECTED REGIONS OF A GUIDE BAR FOR CHAIN SAWS, AND GUIDE BAR PRODUCED THEREBY

BACKGROUND OF THE INVENTION

The invention relates to the hardening of edge surfaces of chain saw guide bars.

Guide bars for chain saws have long been made with hardened edge surfaces, produced by the deposition of a surface layer of a material that is harder than the guide bar body, by welding according to patents U.S. Pat. No. 2,962,812 or U.S. Pat. No. 3,241,228, or by a heat treatment. Normal carbon steel grades such as used in guide bars are conventionally hardened by being heated to a temperature above 750° C., preferably around 800° C., followed by rapid quenching to below 400° C. The heating is conveniently done by electric induction, and the quenching by spraying with a coolant medium such as oil emulsion or cold air. The shape of the induction coil will influence the temperature distribution over the cross section, and the shape and location of coolant nozzles will influence the quenching speed, making it possible to choose the hardness distribution in the guide bar. Since the hardened edges are considerably harder than the part of the saw chain link which slides along the guide bar edges, the rate of wear of the hardened edges is reduced and occurs mainly on the links of the chain, which is of little consequence, because the links normally have a shorter lifetime for other reasons.

The higher hardness is, however, accompanied by higher brittleness and higher risk of cracking due to vibrations and bending. These cracks do not normally lead to fracture of the entire guide bar, and usually penetrate only the hard surface layer, but will then cause unevenness and rapid wear of the chain. After long use, the surface cracks can constitute starting points of deeper fatigue cracks. The largest risk of cracking occurs close to the front border of the rear part of the guide bar which is clamped between a clamping plate and the machinery part of the chain saw, since the bending moment acting on the guide bar is greatest in a narrow region R in front of and behind this border (see the conventional guide bar 10A depicted in FIG. 3), and since the guide bar in this critical region has oil supply holes and other cutouts causing stress concentration. It is thus previously taught to avoid any form of hardening in this region. The risk of cracking varies over the bar thickness, i.e., the bar dimension lying in a plane extending normal to a longitudinal axis L of the bars, and is largest at the outer corners where the edge surface meets the flat side surfaces of the guide bar.

SUMMARY OF THE INVENTION

The present invention concerns an edge-hardened guide bar and a method of hardening the edges by heat treatment, which combines good wear resistance with low risk of cracking, and which may be continued through the critical region at the border of the clamped part of the guide bar.

The chain saw guide bar comprises outer side surfaces, a longitudinal groove having opposed side walls extending substantially parallel to the side surfaces, and edge surfaces. Each edge surface extends transversely from one of the side surfaces to a respective one of the side walls to form therewith outer and inner corners, respectively. The inner corners are harder than the outer corners.

The method involves heating each of the edge surfaces along the entire transverse width thereof, heating the side surfaces and side walls at least at regions thereof forming the outer and inner corners, quenching each of the side walls at least at a region thereof which forms the inner corners, quenching each of the edge surfaces at a region thereof which forms the inner corner and extends at least substantially to the outer corner, and performing no quenching of the side surfaces in the vicinity of the outer corners, whereby the outer corners are given less hardness than the inner corners.

BRIEF DESCRIPTION OF THE DRAWING

A guide bar hardened according to a preferred embodiment of the invention is shown in cross-section in FIGS. 1 and 2.

DETAILED DESCRIPTION OF A PREFERRED EMBODIMENT

Figure 1:
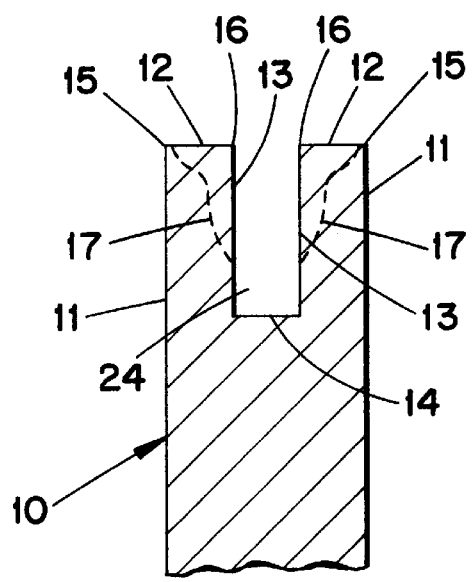
FIG. 1 shows which points and surfaces of the guide bar have special requirements for hardness.
Figure 2:
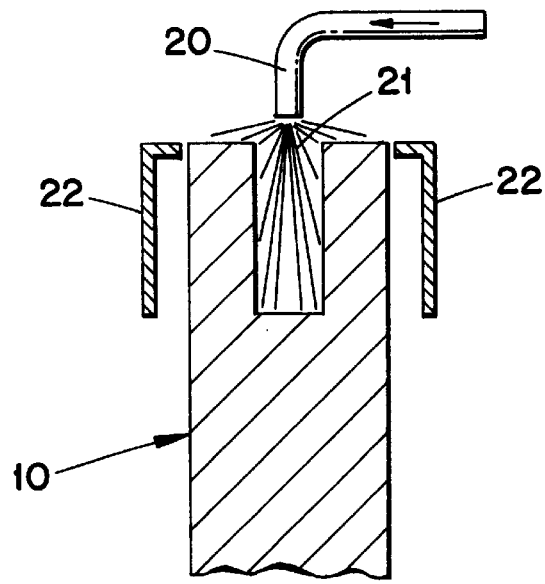
FIG. 2 shows the location of coolant nozzles and covers during the hardening treatment.

The surfaces of a guide bar (10) comprise flat side surfaces (11), edge surfaces (12), chain groove side walls (13) and chain groove bottom (14). The edge surfaces (12) meet the side surfaces (11) at outer corners (15) and meet the groove sides (13) at inner corners (16).

The edge surfaces (12) and the groove side walls (13) will be in sliding contact with the links of a saw chain (not shown), and should thus have high hardness at least in the regions adjoining the inner corners (16). The largest bending stresses occur at the outer corners (15) and the adjoining parts of the side surfaces (11), which should thus be less hard than the inner corners.

As noted earlier herein, normal carbon steel grades such as used in guide bars are conventionally hardened by being heated to a temperature above 750° C., preferably around 800° C., followed by rapid quenching to below 400° C. The heating is conveniently done by electric induction, and the quenching by spraying with a coolant medium such as oil emulsion or cold air. The shape of the induction coil will influence the temperature distribution over the cross section of the guide bar, and the shape and location of coolant nozzles will influence the quenching speed, making it possible to choose the hardness distribution throughout the guide bar.

According to the present invention, heat is applied by an induction coil (not shown) to the entire area of each of the edge surfaces (12) as well as the adjoining parts of the groove sides (13) and side surfaces (11). This can be achieved for example by letting the induction coil penetrate into the chain groove 24 between the groove side walls for at least a part of the depth thereof. For quenching, coolant (21) is sprayed by a nozzle (20) into the chain groove and on the edge surfaces, but not at all on the flat side surfaces (11), which are protected from the coolant by protective covers (22) or by flowing a stream of hot medium (not shown) along the side surfaces. The covers may be heated to keep the side surfaces warm. The result is that the upper part of the groove sides (13), the inner corners (16) and the edge surfaces (12) are fully hardened, while the side surfaces (11) and the outer corners (15) are so slowly cooled that they get low hardness. A subsequent step tempering will increase the toughness and restrict the hardness of the harder parts to what is most suitable for wear resistance, 55–63 HRC, while the softer parts have a hardness lower than 47 HRC.

A chain saw guide bar according to the invention has as much high wear resistance as a bar where the higher hardness extends to the side surfaces (11), but is much less prone to crack formation, since the most highly stressed regions, i.e., the regions at the outer corners (15) and adjoining parts of the side surfaces (11), are much softer and tougher.

The thickness of the hardened layer should be higher at the edge surfaces (12), where the wear from the chain is largest, than on the groove sides (13). The border (17) between the fully (functionally) hard region and the soft region should run generally from the vicinity of the outer corners (15) slopingly towards the groove bottom (14) as shown in FIG. 1.

Figure 3:
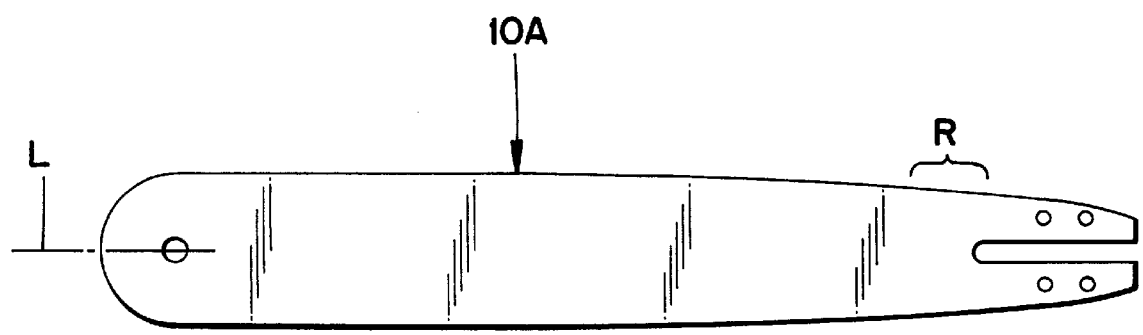
FIG. 3 is a side view of a conventional guide bar.

As a result of the invention, since the outer corners 15 lying in a plane normal to a longitudinal axis of the bars are given less hardness than the inner corners 16 lying in that plane, it is possible to continue the edge-hardening treatment through the critical region R shown in FIG. 3.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed:

1. A chain saw guide bar defining a longitudinal axis and comprising outer side surfaces, a longitudinal saw chain groove having opposed side walls extending substantially parallel to the side surfaces, and two edge surfaces, each edge surface extending transversely from one of the outer side surfaces to a respective one of the side walls to form therewith outer and inner corners, respectively, the inner corners lying in a plane disposed normal to the longitudinal axis and heat treated to be harder than the outer corners lying in that plane.

2. The chain saw guide bar according to claim 1 wherein portions of the side walls forming the inner corners are harder than portions of the outer side surfaces forming the outer corners.

3. The chain saw according to claim 2 wherein a border separating a fully hardened region and a softer region of the guide bar extends from a location on each edge surface spaced slightly inwardly from the respective outer corner, and slopes generally toward a floor of the groove.

4. The chain saw guide bar according to claim 1 wherein the inner corners are heat treated to be harder than the outer corners along an entire longitudinal length thereof.

* * * * *